US011019174B2

(12) United States Patent
Cunico et al.

(10) Patent No.: US 11,019,174 B2
(45) Date of Patent: *May 25, 2021

(54) ADDING CONVERSATION CONTEXT FROM DETECTED AUDIO TO CONTACT RECORDS

(71) Applicant: International Business Machines Corporation, Armonk, NY (US)

(72) Inventors: Hernan A. Cunico, Holly Springs, NC (US); Asima Silva, Holden, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/695,077

(22) Filed: Nov. 25, 2019

(65) Prior Publication Data

US 2020/0099767 A1 Mar. 26, 2020

Related U.S. Application Data

(63) Continuation of application No. 15/849,496, filed on Dec. 20, 2017, now Pat. No. 10,542,114, which is a continuation of application No. 15/793,977, filed on Oct. 25, 2017, now Pat. No. 10,547,708.

(51) Int. Cl.
*G10L 15/18* (2013.01)
*H04L 29/08* (2006.01)
(Continued)

(52) U.S. Cl.
CPC ............ *H04L 67/306* (2013.01); *G06F 40/30* (2020.01); *G10L 15/1815* (2013.01);
(Continued)

(58) Field of Classification Search
None
See application file for complete search history.

(56) References Cited

U.S. PATENT DOCUMENTS 6,185,527 B1 2/2001 Petkovic et al.
9,256,396 B2 2/2016 Monson et al.
(Continued)

OTHER PUBLICATIONS

List of Patents and Applications Treated as Related, dated Nov. 25, 2019, Total 2 pages.

(Continued)

*Primary Examiner* — Neeraj Sharma
(74) *Attorney, Agent, or Firm* — Konrad, Raynes, Davda and Victor LLP; David W. Victor

(57) ABSTRACT

Provided are a computer program product, system, and method for adding conversation context from detected audio to contact records. An audio stream is received through a microphone of a personal computing device. Context analysis is performed of the audio stream to detect conversation context in the audio stream. A request is received to associate the conversation context with a selected contact person. A determination is made of conversation context detected from a segment of the audio stream received during a period of time from when the request was received. The conversation context determined for the period of time is included in a contact record for the selected contact person. The contact record is stored in a contact database including a plurality of contact records for a plurality of contact persons, wherein the contact records include conversation context and location information associated with the contact persons.

20 Claims, 7 Drawing Sheets

Contact Record

(51) Int. Cl.
*H04M 3/22* (2006.01)
*H04M 1/27453* (2020.01)
*G06F 40/30* (2020.01)
*H04M 1/72454* (2021.01)
*H04M 1/72484* (2021.01)
*G10L 15/26* (2006.01)

(52) U.S. Cl.
CPC .......... *G10L 15/1822* (2013.01); *H04L 67/18* (2013.01); *H04M 1/27453* (2020.01); *H04M 1/72454* (2021.01); *H04M 1/72484* (2021.01); *H04M 3/2218* (2013.01); *G10L 15/26* (2013.01); *H04M 2250/74* (2013.01)

(56) References Cited

U.S. PATENT DOCUMENTS

| | | | |
|---|---|---|---|
| 9,277,365 B1* | 3/2016 | Wilden | H04W 64/00 |
| 9,807,045 B2 | 10/2017 | Malahy | |
| 10,248,379 B2 | 4/2019 | Steinberg | |
| 10,339,935 B2 | 7/2019 | Cilingir et al. | |
| 10,713,485 B2* | 7/2020 | Ekambaram | G06T 19/006 |
| 2011/0196737 A1* | 8/2011 | Vadlamani | G06Q 30/02 |
| | | | 705/14.49 |
| 2011/0276396 A1 | 11/2011 | Rathod | |
| 2012/0022872 A1 | 1/2012 | Gruber et al. | |
| 2012/0290950 A1* | 11/2012 | Rapaport | H04N 21/8358 |
| | | | 715/753 |
| 2013/0046831 A1* | 2/2013 | Schultz | G06F 21/6227 |
| | | | 709/206 |
| 2013/0073473 A1 | 3/2013 | Heath | |
| 2014/0129942 A1 | 5/2014 | Rathod | |
| 2014/0222793 A1 | 8/2014 | Sadkin et al. | |
| 2014/0380420 A1* | 12/2014 | Wang | G06Q 10/10 |
| | | | 726/4 |
| 2015/0205518 A1 | 7/2015 | Strazisar et al. | |
| 2015/0269236 A1* | 9/2015 | Rosen | G16H 40/67 |
| | | | 707/602 |
| 2015/0269938 A1* | 9/2015 | Lloyd | G10L 15/26 |
| | | | 704/235 |
| 2016/0092469 A1 | 3/2016 | Mukherjee et al. | |
| 2016/0315899 A1 | 10/2016 | Brunn et al. | |
| 2016/0344674 A1 | 11/2016 | Brunn et al. | |
| 2016/0352887 A1 | 12/2016 | Na et al. | |
| 2017/0032308 A1 | 2/2017 | Cunico et al. | |
| 2017/0083599 A1 | 3/2017 | Bostick et al. | |
| 2017/0186425 A1 | 6/2017 | Dawes et al. | |
| 2018/0032499 A1* | 2/2018 | Hampson | G06F 40/253 |
| 2018/0032585 A1* | 2/2018 | Kadiyala | G06N 20/00 |
| 2018/0349688 A1 | 12/2018 | Barari et al. | |
| 2019/0042086 A1 | 2/2019 | White et al. | |
| 2019/0124178 A1 | 4/2019 | Cunico et al. | |
| 2019/0124179 A1 | 4/2019 | Cunico et al. | |

OTHER PUBLICATIONS

U.S. Patent Application. dated Oct. 25, 2017, for U.S. Appl. No. 15/793,977 (137.02), filed Oct. 25, 2017, invented by Hernan A. Cunico et al., Total 34 pages.
Preliminary Amendment, dated Dec. 20, 2017, for U.S. Appl. No. 15/793,977 (137.02), filed Oct. 25, 2017, invented by Hernan A. Cunico et al., Total pp. 12.
Office Action, dated May 15, 2019, for U.S. Appl. No. 15/793,977 (137.02), filed Oct. 25, 2017, invented by Hernan A. Cunico et al., Total 26 pages.
Reponse to Office Action, dated Aug. 18, 2019, for U.S. Appl. No. 15/793,977 (137.02), filed Oct. 25, 2017, invented by Hernan A. Cunico et al., Total 11 pages.
Notice of Allowance, dated Sep. 5, 2019, for U.S. Appl. No. 15/793,977 (137.02), filed Oct. 25, 2017, invented by Hernan A. Cunico et al., Total 23 pages.
Corrected Notice of Allowability, dated Nov. 6, 2019, for U.S. Appl. No. 15/793,977 (137.02), filed Oct. 25, 2017, invented by Hernan A. Cunico et al., Total 20 pages.
U.S. Patent Application, dated Dec. 20, 2017, for U.S. Appl. No. 15/849,496 (137.02C1), filed Oct. 25, 2017, invented by Hernan A. Cunico et al., Total 34 pages.
Preliminary Amendment, dated Dec. 20, 2017, for U.S. Appl. No. 15/849,496 (137.02C1), filed Dec. 20, 2017, invented by Hernan A. Cunico et al., Total 8 pages.
Office Action, dated May 28, 2019, for U.S. Appl. No. 15/849,496 (137.02C1), filed Oct. 25, 2017, invented by Hernan A. Cunico at al., Total 23 pages.
Response to Office Action, dated Aug. 18, 2019, for U.S. Appl. No. 15/849,496 (137.02C1), filed Oct. 25, 2017, invented by Hernan A. Cunico et al., Total 8 pages.
Notice of Allowance, dated Sep. 5, 2019 for U.S. Appl. No. 15/849,496 (137.02C1), filed Oct. 25, 2017, invented by Hernan A. Cunico et al., Total 20 pages.
Corrected Notice of Allowability, dated Nov. 6, 2019, for U.S. Appl. No. 15/849,496 (137.02C1), filed Oct. 25, 2017, invented by Hernan A. Cunico et al., Total 17 pages.
E. Freeman et al., "Lifestreams: A Storage Model for Personal Data," dated 1996, ACM SIGMOD Record 25., Total 7 pages.
T. Erickson et al., "Socially Translucent Systems: Social Proxies, Persistent Conversation, and the Design of Babble'," dated May 1999, In Proceedings of the SIGCHI Conference on Human Factors in Computing Systems, ACM, Total 8 pages.
J. Zhang et al., "SISN: A Toolkit for Augmenting Expertise Sharing Via Social Networks," dated 2007, In International Conference on Online Communities and Social Computing, Total 10 pages.
IBM, "IBM Content Analytics Reveal Information From Your Unstructured Data" dated 2012, IBM Software Enterprise Content Management, Total 4 pages.
"Introduction to Natural Language Processing (NLP) 2016"— Algorithmia, dated Aug. 11, 2016 , Total 8 pages.
Watson, "Product Overview", dated , Watson Content Analytics, (online) retrieve from the Internet at URL> https://www.ibm.com/support/knowledgecenter/SS5RWK_3.5.0/com.ibm....1, Total 1 page.
Rhodes et al., "The Wearable Remembrance Agent: A System for Augmented Memory", dated 1997, Total 10 pages.
Google, "Cloud Speech API", Speech to Text Conversion Powered by Machine Learning, Google Cloud Platform, downloaded on Sep. 17, 2017, Total 6 pages.
Wikipedia "Natural Language Processing" downloaded Sep. 17, 2017, Retrieved from the Internet at URL> https://en.wikipedia.org/wiki/Natural_language_processing, Total 7 pages.
J. Gemmell et al., "MyLifeBits: Fulfilling the Memex Vision," dated 2002, Proceedings of ACM Multimedia', Total 5 pages.

* cited by examiner

ADDING CONVERSATION CONTEXT FROM DETECTED AUDIO TO CONTACT RECORDS

BACKGROUND OF THE INVENTION

1. Field of the Invention

The present invention relates to a computer program product, system, and method for adding conversation context from detected audio to contact records.

2. Description of the Related Art

Current personal information managers include a contact database where users may maintain information on stored contacts, including name, address, email, phone and other contact information. The user may also supplement contact information with notes and other information, such as web sites, pictures and attachments.

There is a need in the art for developing improved techniques for providing enhanced information for contact records.

SUMMARY

Provided are a computer program product, system, and method for adding conversation context from detected audio to contact records. An audio stream is received through a microphone of a personal computing device. Context analysis is performed of the audio stream to detect conversation context in the audio stream. A request is received to associate the conversation context with a selected contact person. A determination is made of conversation context detected from a segment of the audio stream received during a period of time from when the request was received. The conversation context determined for the period of time is included in a contact record for the selected contact person. The contact record is stored in a contact database including a plurality of contact records for a plurality of contact persons, wherein the contact records include conversation context and location information associated with the contact persons.

DETAILED DESCRIPTION

Described embodiments provide improvements to computer technology to analyze audio detected on a personal computing device and associate conversation context and location information for the detected audio stream with contact records in a contact database. Described embodiments provide improvements to the data structures and algorithms used to gather and analyze audio information and associate with contact records. With described embodiments, the personal computing device may continually analyze a detected audio stream through a microphone of the computing device and store analyzed conversation context and location information in a conversation context stream and location information stream. This saved conversation context and location information for recently held conversations may then be associated with data structures for personal contacts to be available for recall.

Described embodiments provide improved computer database technologies to save recent conversation context and location information in conversation context stream and a location information stream data structures. Further described embodiments provided technological improvements to contact record data structures and contact databases to provide an enhanced contact record to store gathered conversation context and location information for conversations held with the contact.

Figure 1:
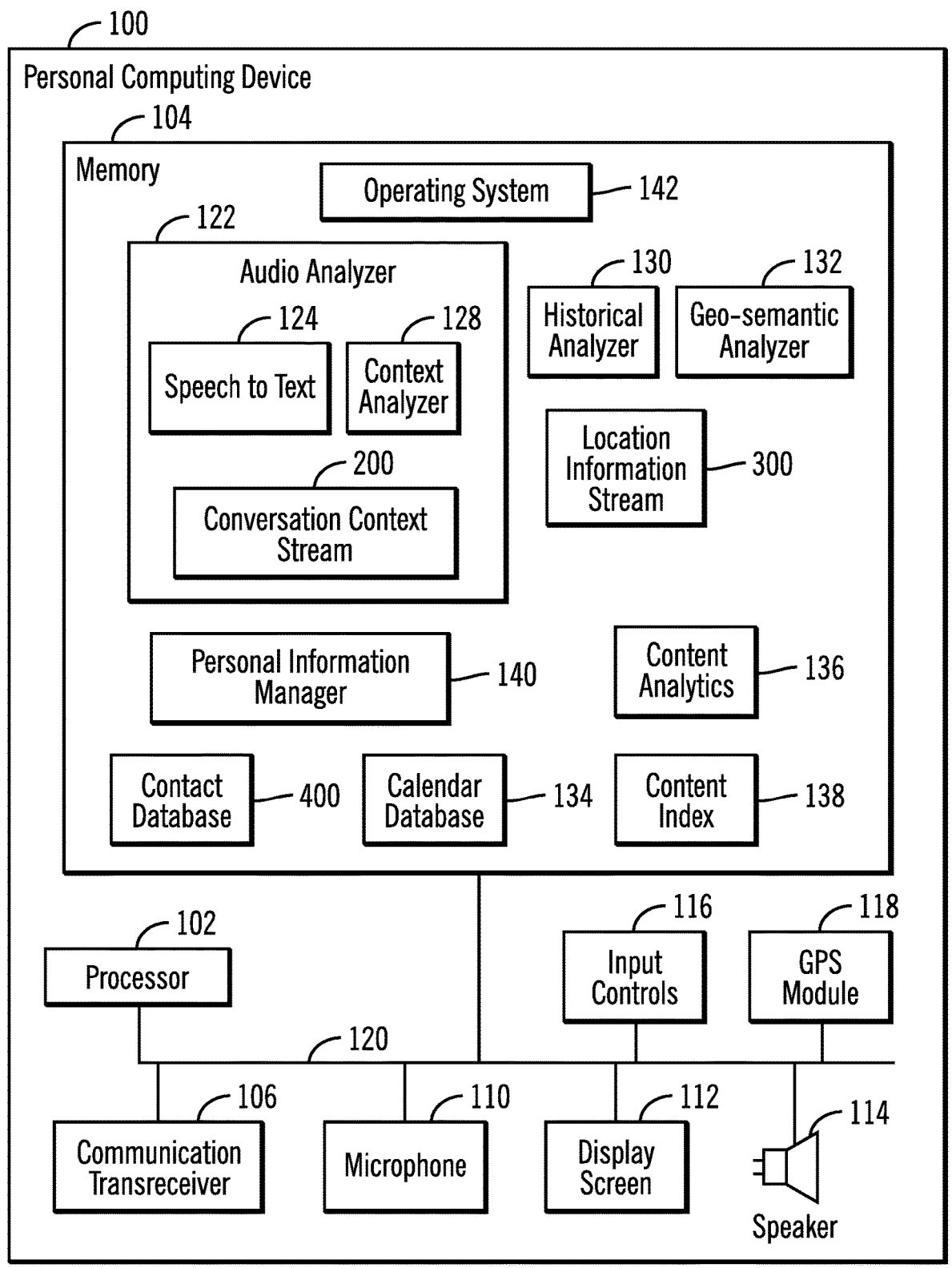
FIG. 1 illustrates an embodiment of a personal computing device.

FIG. 1 illustrates an embodiment of a personal computing device 100 configured for use to assist a user in supplementing information on contacts with information on previously held conversations and interactions with the contact. The personal computing device 100 includes a processor 102, a main memory 104, a communication transceiver 106 to communicate (via wireless communication or a wired connection) with external devices, including a network, such as the Internet, a cellular network, etc.; a microphone 110 to receive as input sound external to the personal computing device 100; a display screen 112 to render display output to a user of the personal computing device 100; a speaker 114 to generate sound output to the user; input controls 116 such as buttons and other software or mechanical buttons, including a keyboard, to receive user input; and a global positioning system (GPS) module 118 to determine a GPS potions of the personal computing device. The components 102-118 may communicate over one or more bus interfaces 120.

The main memory 104 may include various program components including an audio analyzer 122 to analyze context of audio content received over the microphone 110, including a speech to text converter 124 to convert audio and voice into written text to be analyzed, a context analyzer 128 to analyze the context of the converted audio to determine conversation context, such as topics of conversation, names mentioned, locations mentioned, emotions, etc. Conversation context instances gathered at different times of the processed audio stream are stored in a conversation context stream 200. The memory 104 includes a historical analyzer 130 to determine whether user data sources, such as emails, texts, social media posts, etc., include names, locations, and topics of conversation determined from the conversation context. The historical analyzer 130 may include application programming interfaces (APIs) to access user data sources, such as email, text accounts, social media accounts, etc.

The memory 104 includes a geo-semantic analyzer 132 to process geographical location information from the GPS module 118 to determine information on the geographical location, such as using a local or cloud based mapping service to determine venue description of the geographical location, such as a name of the location, business, building, owner or entity name, etc., and then to access further information on the location, such as go to an Internet web site associated with the venue determined from the mapping service to determine events occurring at the venue. The geo-semantic analyzer 132 may also access a user calendar database 134 having scheduled user calendar events to determine if there is a scheduled calendar event for the time at which the geographical location was determined. The geo-semantic analyzer 132 may store gathered location information instances in a location information stream 300 having location information instances for different times at which the geographical information was determined.

The memory 104 includes content analytics 136 to analyze different user data sources, such as email accounts, messages, social media accounts, etc., and generate a content index 138 providing an indexed of the analyzed data sources, such as posting lists. The historical analyzer 130 may process the content index 138 to determine user content in user data sources, either local or external to the personal computing device 100, that is relevant to conversation context and location information.

The memory 104 includes a personal information manager 140 to manage personal information of the user of the personal computing device 100, including the calendar database 134 having stored calendar events for an electronic calendar and a contact database 400 having contact records providing contact information for contacts. The personal information manager 140 may further interact with the audio analyzer 122, historical analyzer 130, geo-semantic analyzer 132, and the content analytics 136 to manage and gather personal information for the user.

The speech to text convertor 124 may comprise a speech to text convertor program, such as, by way of example, the International Business Machines Corporation (IBM) Watson™ Speech to Text service, the context analyzer 128 may comprise a natural language processor, such as by way of example, the Watson™ Natural Language Understanding, providing APIs to determine, from the text of the converted audio, topics of conversation, names, locations, and the Watson™ Tone Analyzer to analyze emotions and tones based on the text converted from audio. The content analytics 136 may comprise a content manager or search crawler, such as the Watson™ Content Analytics that collects and analyzes structured and unstructured content. (IBM and Watson are trademarks of International Business Machines Corporation throughout the world).

The main memory 104 may further include an operating system 142 to manage the personal computing device 100 operations and interface with device components 102-120.

The personal computing device 100 may comprise a smart phone, personal digital assistance (PDA), or stationary computing device capable to process audio and voice detected by the microphone 110. The memory 104 may comprise non-volatile and/or volatile memory types, such as a Flash Memory (NAND dies of flash memory cells), a non-volatile dual in-line memory module (NVDIMM), DIMM, Static Random Access Memory (SRAM), ferroelectric random-access memory (FeTRAM), Random Access Memory (RAM) drive, Dynamic RAM (DRAM), storage-class memory (SCM), Phase Change Memory (PCM), resistive random access memory (RRAM), spin transfer torque memory (STM-RAM), conductive bridging RAM (CBRAM), nanowire-based non-volatile memory, magnetoresistive random-access memory (MRAM), and other electrically erasable programmable read only memory (EEPROM) type devices, hard disk drives, removable memory/storage devices, etc.

The bus 120 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Generally, program modules, such as the program components 122, 124, 128, 130, 132, 136, 140, 142, etc., may comprise routines, programs, objects, components, logic, data structures, and so on that perform particular tasks or implement particular abstract data types. The program modules may be practiced in distributed cloud computing environments where tasks are performed by remote processing devices that are linked through a communications network. In a distributed cloud computing environment, program modules may be located in both local and remote computer system storage media including memory storage devices.

The program components and hardware devices of the personal computing device 100 of FIG. 1 may be implemented in one or more computer systems, where if they are implemented in multiple computer systems, then the computer systems may communicate over a network.

The program components 122, 124, 128, 130, 132, 136, 140, 142 may be accessed by the processor 102 from the memory 104 to execute. Alternatively, some or all of the program components 122, 124, 128, 130, 132, 136, 140, 142 may be implemented in separate hardware devices, such as Application Specific Integrated Circuit (ASIC) hardware devices.

The functions described as performed by the program components 122, 124, 128, 130, 132, 136, 140, 142 may be implemented as program code in fewer program modules than shown or implemented as program code throughout a greater number of program modules than shown.

Figure 2:
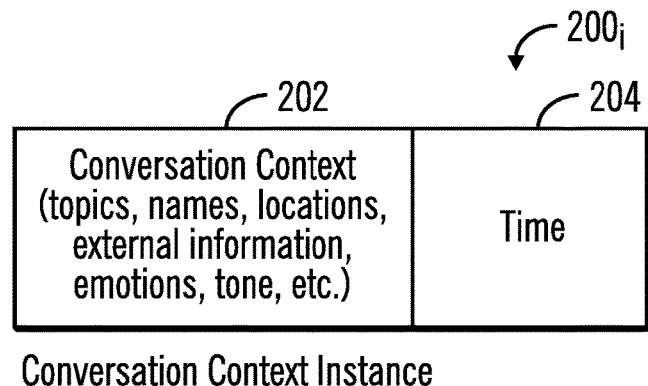
FIG. 2 illustrates an embodiment of a conversation context instance.

FIG. 2 illustrates an embodiment of a conversation context instance $200_i$, the context analyzer 128 inserts into the conversation context stream 200, and includes conversation context 202, such as topics of conversation, names, locations, classifications, external information, emotions, tone, etc., and a time 204 of an audio segment in a detected audio stream from which the conversation context 202 was determined.

Figure 3:
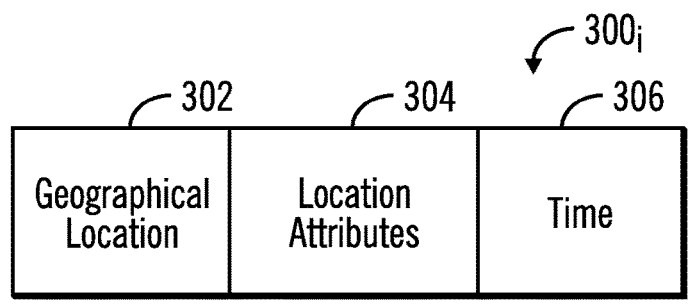
FIG. 3 illustrates an embodiment of a location information instance.

FIG. 3 illustrates an embodiment of location information instance $300_i$, the geo-semantic analyzer 132 inserts into the location information stream 300, and includes a geographical location 302, such as from the GPS module 118; location attributes 304, such as a name of the location, events scheduled at the location as determined from an external website providing information for the location, such as an entity web site, or scheduled events from the calendar database 134; and a time 306 the geographical location 302 was determined.

Figure 4:
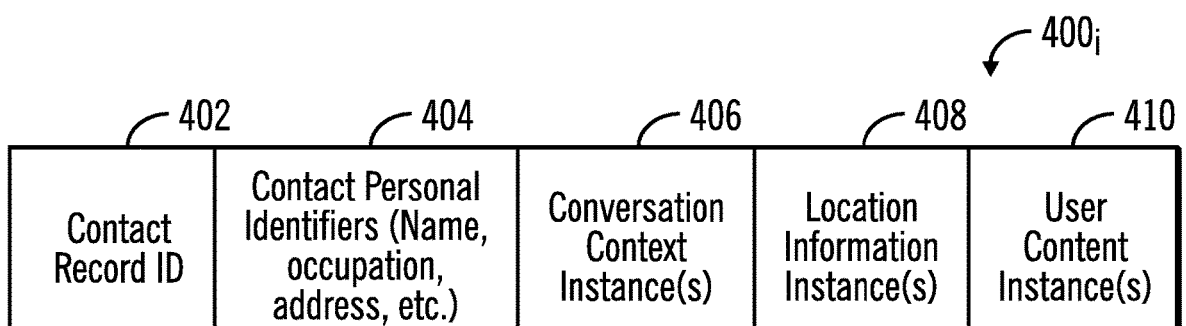
FIG. 4 illustrates an embodiment of a contact record.

FIG. 4 illustrates an embodiment of a contact record $400_i$ in the contact database 400 for a contact, including a contact record identifier (ID) 402; contact personal identifiers 404, such as a non-rigid designator of a person or entity, including a name, occupation, address, email, phone number, etc.; one or more conversation context instances 406 involving conversations in which the contact was involved; one or more location information instances 408 providing information on a location of the personal computing device 100; and zero or more user content instances 410 providing user content from content sources, e.g., email, text messages, social media postings, found to be relevant to conversation context.

The data structures in FIGS. 2-4 show various fields of information. In alternative embodiments, different fields of information may be provided than that described, such as additional fields of information, or certain described fields of information may not be included.

Figure 5:
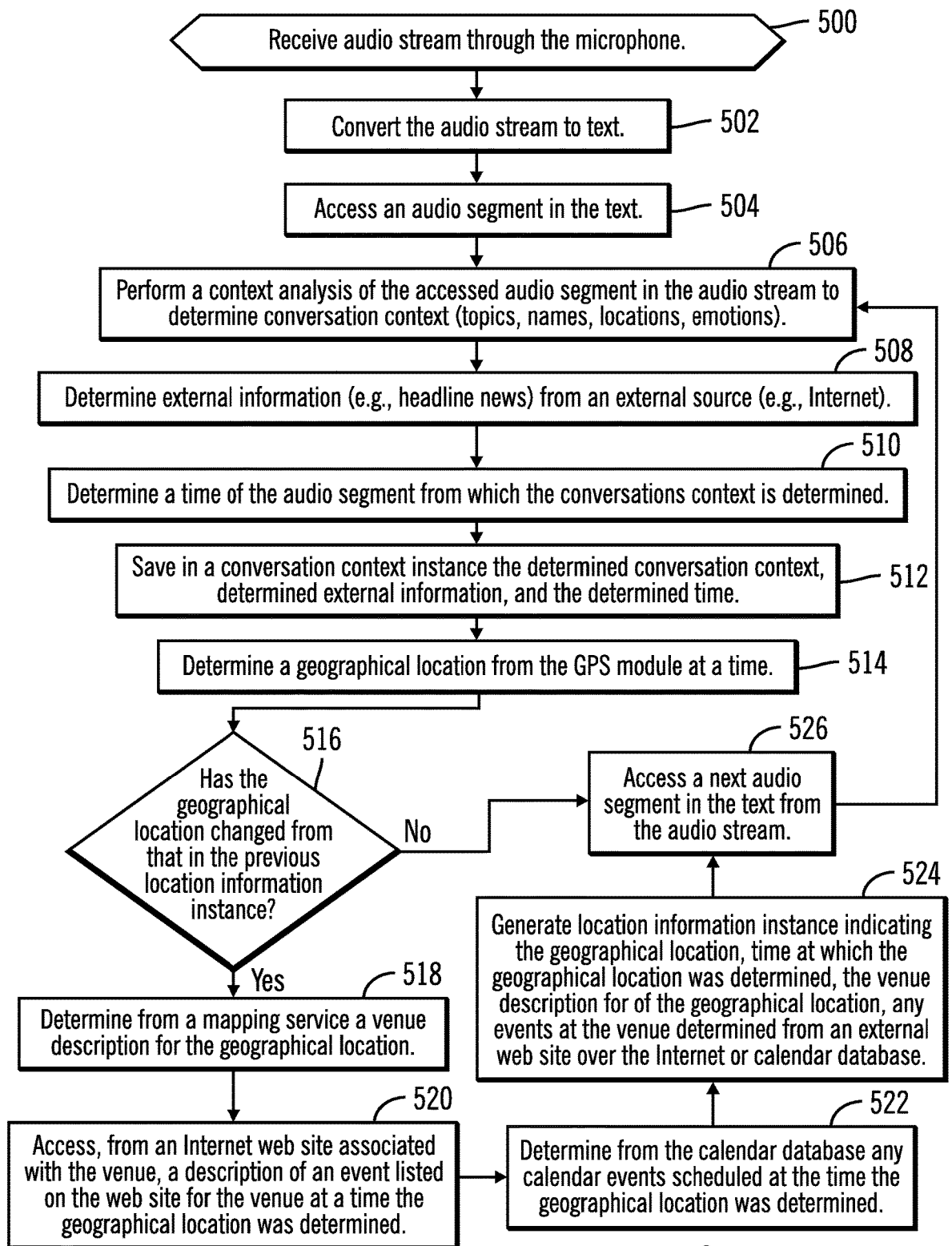
FIG. 5 illustrates an embodiment of operations to collect conversation context and location information for an audio stream captured on a microphone of a personal computing device.

FIG. 5 illustrates an embodiment of operations performed by the audio analyzer 122 and geo-semantic analyzer 132 to generate the conversation context stream 200 and location information stream 300 of information available to include with contact records $400_i$. Upon receiving (at block 500) an audio stream through the microphone 110, which may be converted to an audio file or other multimedia file having audio, the speech to text 124 program converts (at block 502) the audio stream into text. The context analyzer 128 accesses (at block 504) an audio segment in the text and performs (at block 506) a context analysis of the accessed audio segment in the audio stream to determine conversation context (e.g., topics, names, locations, emotions, etc.). The context analyzer 128 may also determine (at block 508) external information, e.g., headline news, that is contemporaneous with the receipt of the audio, from an external source, such as a news web site over the Internet. The context analyzer 128 determines (at block 510) a time of the audio segment from which the conversations context is determined. The determined conversation context and determined external information are saved (at block 512) as conversation context 202 and the determined time is saved as time 204 in a conversation context instance $200_i$ stored in the conversation context stream 200.

At this point, or independently, the geo-semantic analyzer 132 may determine (at block 514) a geographical location, such as GPS coordinates, from the GPS module 118. If (at block 516) the geographical location changed from that in the previous generated location information instance $300_i$ in the location information stream 300, then the geo-semantic analyzer 132 determines (at block 518) from a mapping service, which may be located in the personal computing device 100 or at an external web site, a venue description for the geographical location, such as a name of a commercial or government establishment defined for the location, building, area, park, campus, etc. The geo-semantic analyzer 132 may then access (at block 520), from an Internet web site associated with venue, a description of an event listed on the web site for the venue at a time the geographical location was determined. For instance, if the location is a convention center, sports arena, etc., the web site for that venue may provide a calendar of scheduled events at the venue. The geo-semantic analyzer 132 determines (at block 522) from the user calendar database 134 any calendar events scheduled at the time the geographical location was determined. A location information instance $300_i$ is generated (at block 524) indicating the geographical location in field 302, a time at which the geographical location was determined in field 306, and location attributes 304, such as the venue description for of the geographical location, any events at the venue determined from an external web site over the Internet or calendar database 134, and other determined location information.

If (at block 516) the geographical location has not changed or after generating (at block 524) the location information, the context analyzer 128 accesses (at block 526) a next audio segment in text form from the audio stream and proceeds back to block 506 to process the next segment from the audio stream.

The conversation context stream 200 and location information stream 300 may comprise circular buffers to store a limited amount of information, such that when the buffers or stream have reached their storage limit, new instances $200_i$ and $300_i$ overwrite the oldest instances in the stream 200 and 300, respectively. In this way, conversation context and location information may be stored for a limited period of time, such as some hours, to be available to be associated with contact records 400.

With the operations of FIG. 5, conversation context and location information for a user of the personal computing device 100 is generated and stored in a conversation context stream 200 and location information stream 300, respectively, to be available to associate with contact records if the user selects to include conversation context and location information for a contact person that participated in the conversation.

Figure 6A:
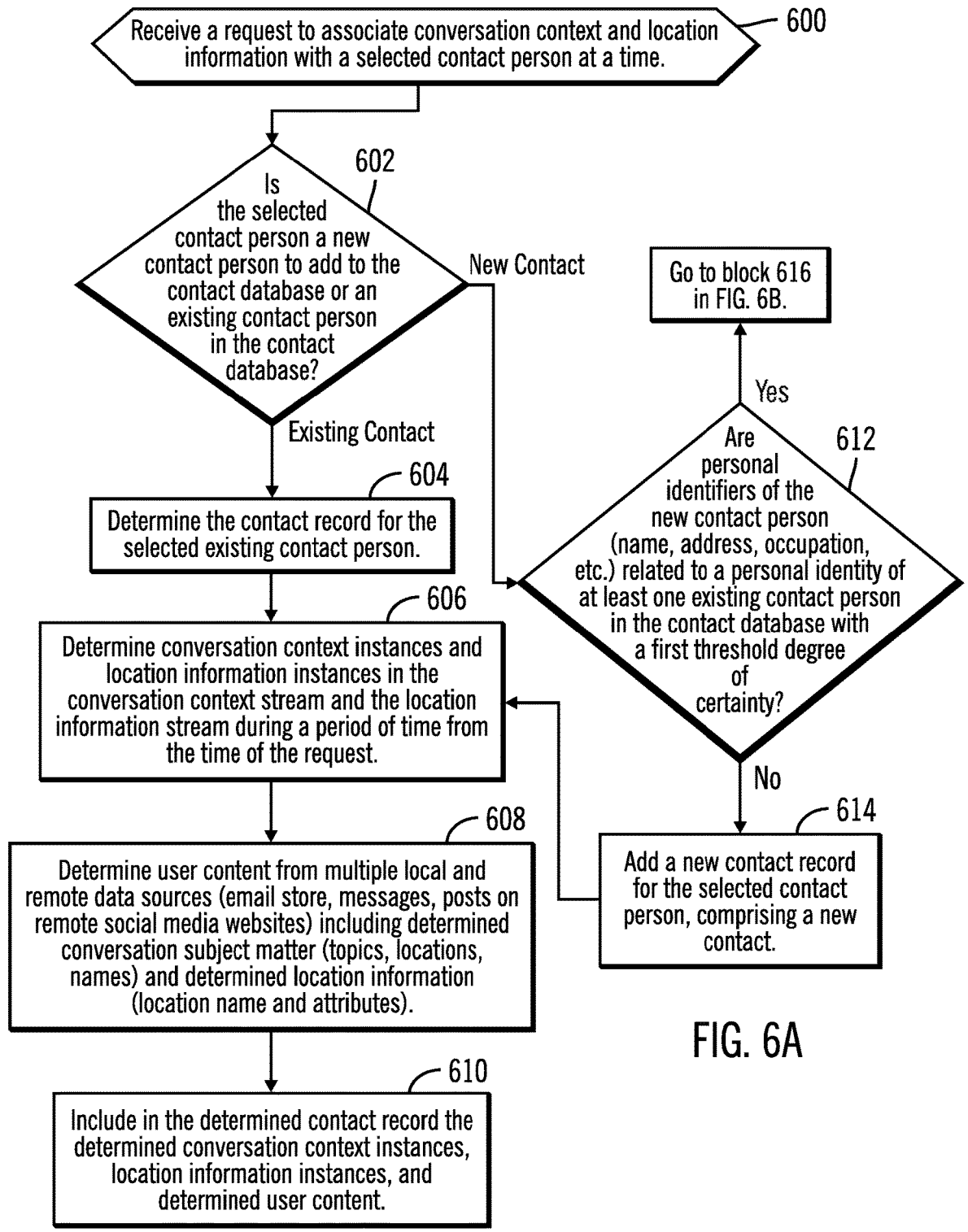
FIGS. 6a and 6b illustrate an embodiment of operations to add collected conversation context and location information to a selected new or existing contact record.
Figure 6B:
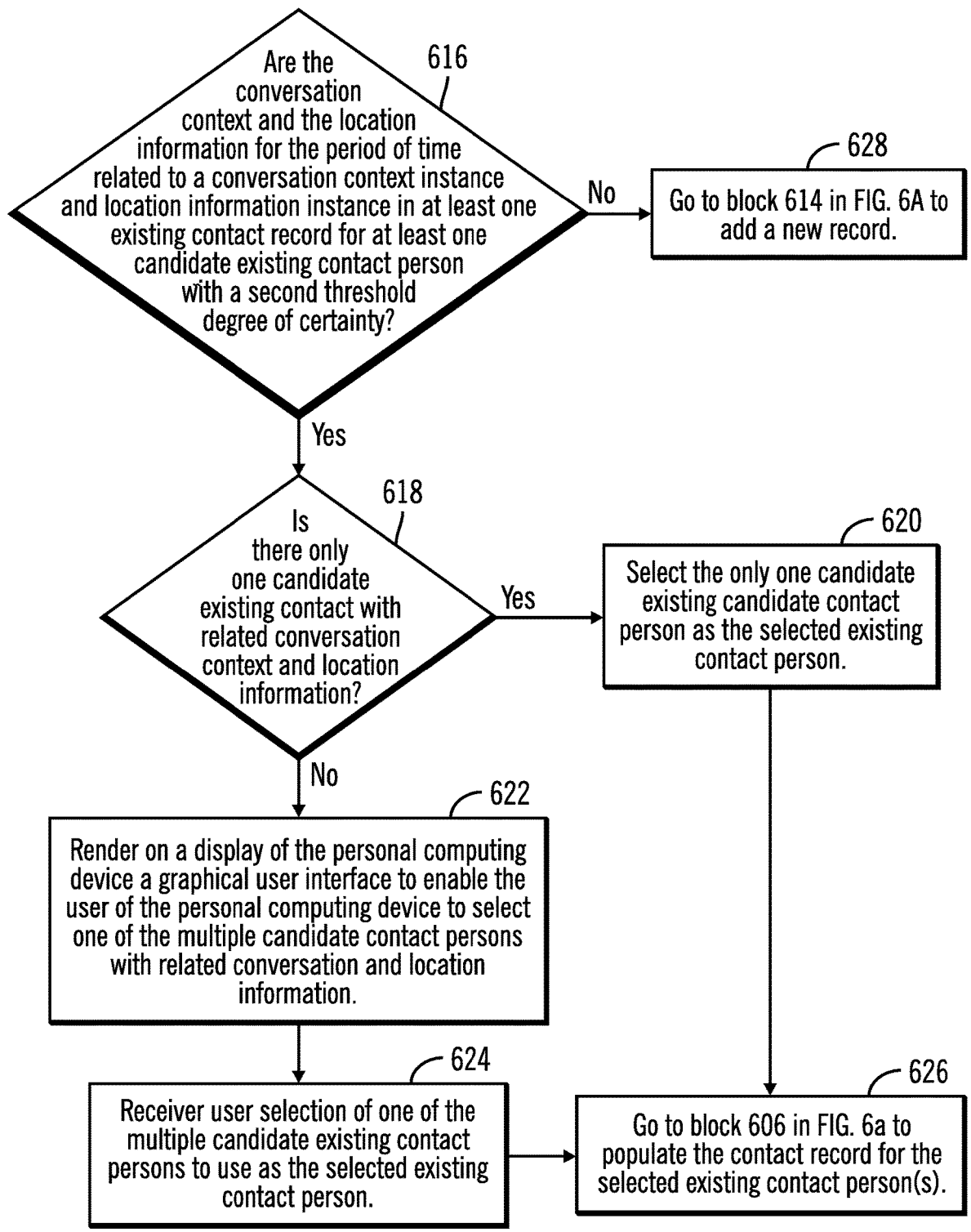

FIGS. 6a and 6b provide an embodiment of operations performed by the personal information manager 140, historical analyzer 130, or some other component to process a request by a user of the portable computing device 100 to associate conversation context and location information with a selected contact at a time, where the selected contact may be for a new contact, such as a person the user just spoke with or an existing contact. Upon receiving (at block 600) the request, the personal information manager 140 determines (at block 602) whether the selected contact person is a new contact person to add to the contact database 400 or an existing contact person for which there is an existing contact record $400_i$ in the contact database 400. If (at block 602) the selected contact is an existing contact, then a determination is made (at block 604) of the contact record $400_i$ for the selected existing contact person in the contact database 400.

A determination is made (at block 606) of conversation context instances $200_i$ and location information instances $300_i$ in the conversation context stream 200 and the location information stream 300 during a period of time from the time of the request. The historical analyzer 130 may be called to determine from the content index 138 user content (e.g., emails, text messages, social media posts, etc.) from multiple local and remote data sources (email store, messages, posts on remote social media websites) including determined conversation subject matter (topics, locations, names) and determined location information (location name and attributes). The personal information manager 140 includes (at block 610) in the determined contact record 400, the determined conversation context instances $200_i$ in field 406, location information instances $300_i$ in field 408, and determined user content in field 410, or links thereto.

If (at block 602) the selected contact person is a new contact to add to the contact database 400, then the personal information manager 140 determines (at block 612) whether the personal identifier or designator of the new contact person (name, address, occupation, etc.) are related to personal identifiers 404 in the contact record 400i of at least one existing contact person in the contact database 400 with a first threshold degree of certainty. If there is no existing contact person having related personal identifiers 404, then a new contact record $400_N$ is added (at block 614) to the contact database 400 including the new contact personal identifiers in field 404, and control proceeds to block 606 to add conversation context and location information to the new contact record $400_N$, or links thereto. If (at block 612) the new contact personal identifiers match the personal identifiers 404 of one or more existing contact records $400_i$, for candidate existing contact persons, then control proceeds to block 616 in FIG. 6b to determine whether the conversation context and the location information for the period of time are related to a conversation context instance 406 and a location information instance 408 in at least one existing contact record 400$_i$ for at least one candidate existing contact person with a second threshold degree of certainty.

If (at block 616) the information is related and if (at block 618) there is only one candidate existing contact having related conversation context and location information, then the only on candidate existing candidate contact person is selected (at block 620) as the selected existing contact person. If (at block 618) there are multiple candidate existing contact persons with related conversation context and location information, then the personal information manager 140 renders (at block 622) on the display 112 a graphical user interface to enable the user of the personal computing device 100 to select one of the multiple candidate contact persons with related conversation and location information. Upon receiving (at block 624) user selection of one of the multiple candidate existing contact persons to use as the selected existing contact person or after selecting (at block 620) the only one candidate, control proceeds (at block 626) to block 606 in FIG. 6a to populate the contact records 400$_i$ for the selected existing contact person(s) with the conversation context instance 200$_i$ and location information instances 300$_i$ created from conversation audio during a recent time period from when the request was made.

If (at block 616) there is no relation of the determined conversation context and location information in any of the contact records for candidate existing contact persons having matching personal identifiers, then control proceeds (at block 628) to block 612 in FIG. 6a to add a new contact record 400$_N$.

With the operations of FIGS. 6a and 6b, the user may decide when to add conversation context and location information for recent conversations and current locations to a new or existing contact record. In this way, the user may supplement contact records with conversation context of previous meetings with the contact to be able to recall to enhance future conversations with the contact at a later point in time.

Figure 7:
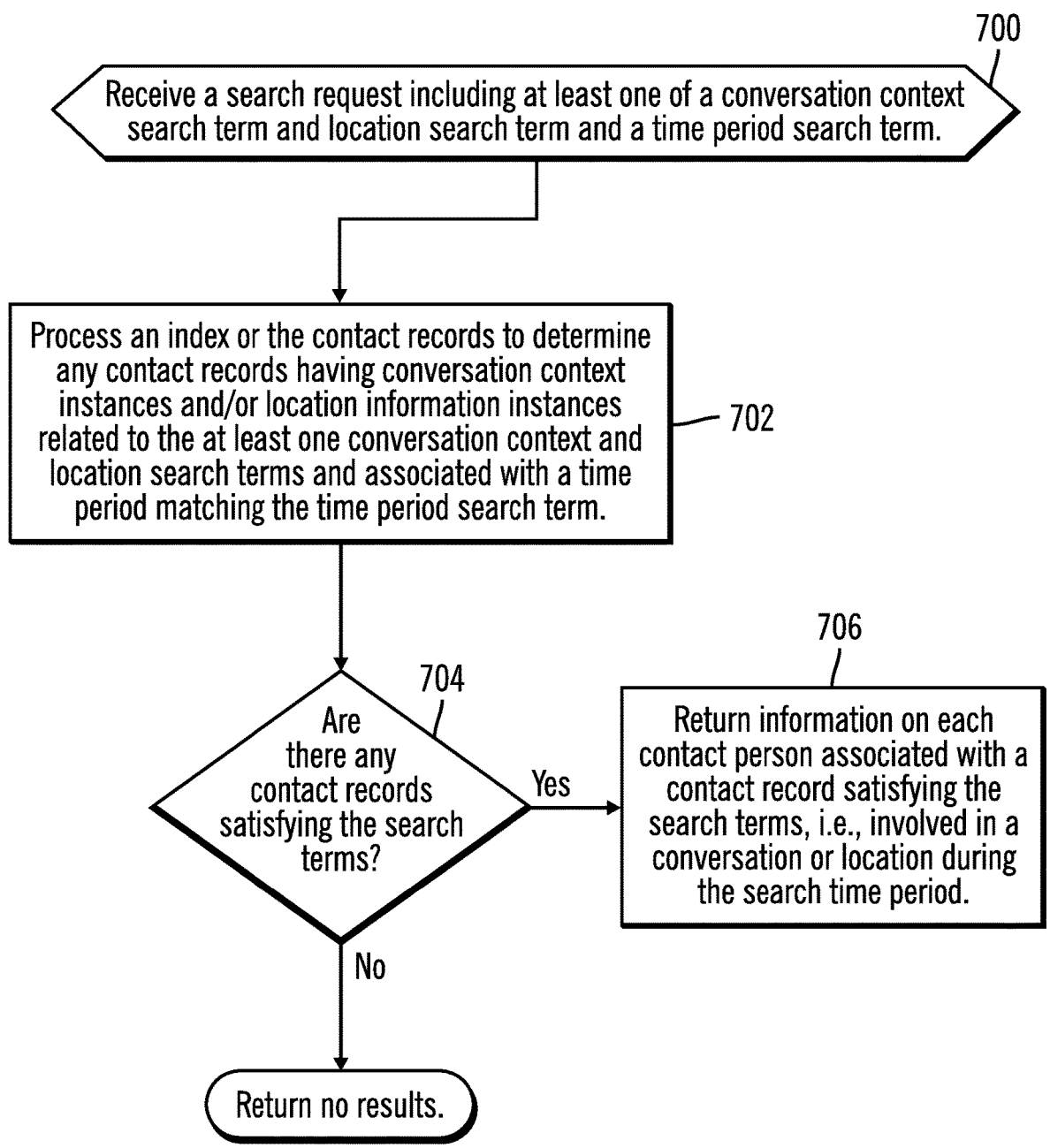
FIGS. 7 and 8 illustrate embodiments of operations to search based on conversation context, location information, time periods, and contacts in the contact records.

FIG. 7 illustrates an embodiment of operations performed by the personal information manager 140 to process a search request providing conversation context and a time period to search to determine contacts involved in conversations having the searched conversation context. Upon receiving (at block 700) a search request including at least one conversation context search term, such as a topic of conversation, and a time period search term, the personal information manager 140 processes (at block 702) an index or the contact records 400$_i$ to determine any contact records 400$_i$ having conversation context instances 406 and/or location information instances 408 related to the at least one conversation context and location search terms and associated with a time period matching the time period search term. If (at block 704) there are contact records 400$_i$ satisfying the search criteria, then the personal information manager 140 returns (at block 706) information on each contact person associated with a contact record 400$_i$ satisfying the search terms, i.e., involved in a conversation or location during the search time period.

With the search of FIG. 7, if a user recalls a topic of conversations or details of a location of an event during a time period, but does not remember the people involved in such conversations, then the search criteria of FIG. 7 may be used to determine those contacts involved in conversations involving the searched conversation topic or at the location matching the location search term.

Figure 8:
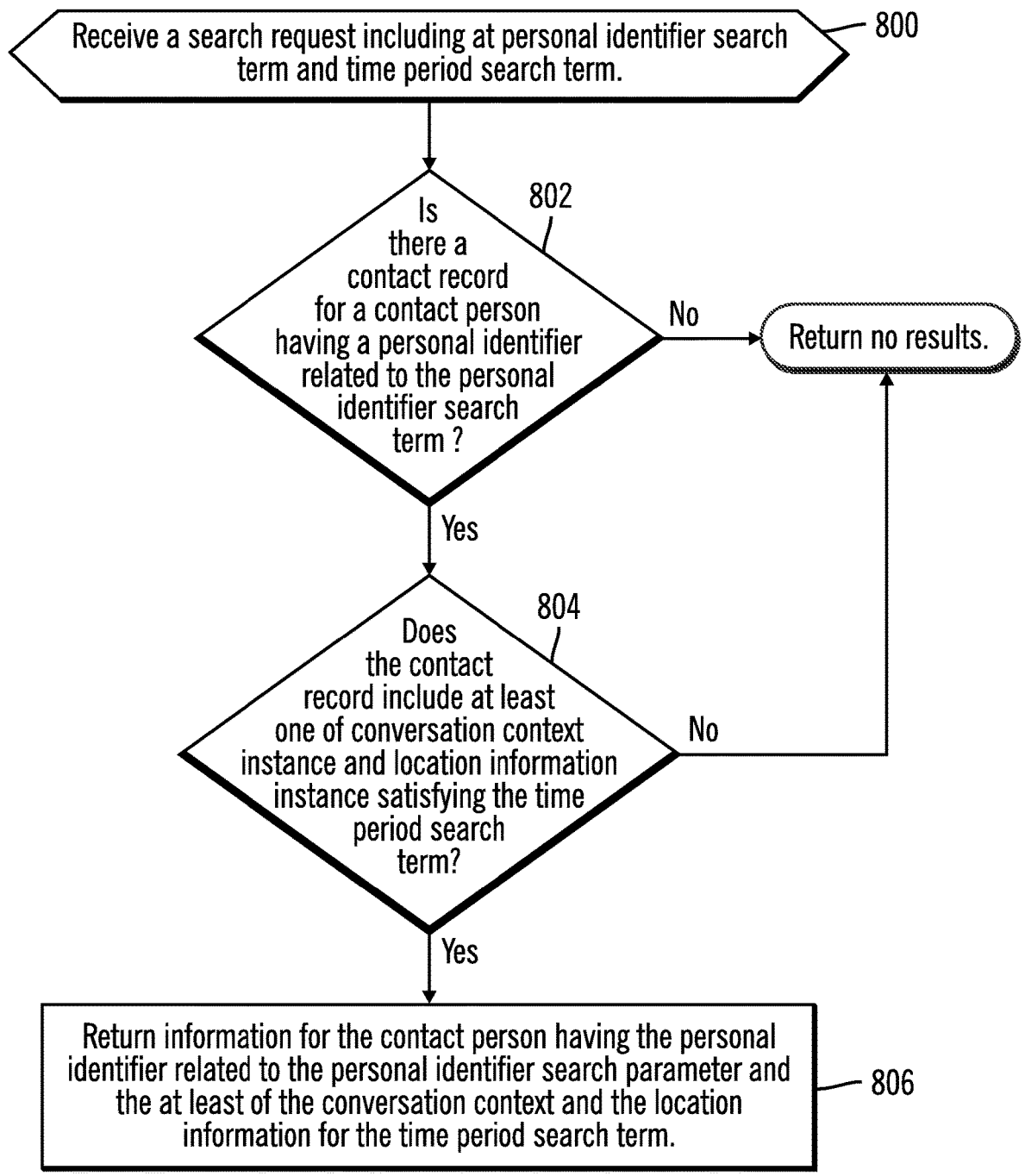

FIG. 8 illustrates an embodiment of operations performed by the personal information manager 140 to process a search request providing a personal identifier search term and time period search term to determine the conversation context and location information for the searched contact at the time period. Upon receiving (at block 800) the search request, the personal information manager 140 determines (at block 802) if there is a contact record 400$_i$ for a contact person having a personal identifier 404 related to the personal identifier search term. If (at block 802) a matching contact person is found, the personal information manager 140 determines (at block 804) whether the contact record 400$_i$ satisfying the personal identifier search term includes at least one of conversation context instance 406 and location information instance 408 having times 204, 306 satisfying the time period search term. If (at block 804) there the matching contact record provides conversation context and location information for the search time period, then is a match, then the personal information manager 140 returns (at block 806) information for the contact person having the personal identifier related to the personal identifier search term and the any determined conversation context instance 406 and/or location information instance 408 having a time 204 and 406 satisfying the time period search term.

With the search of FIG. 8, a user may know of a contact name and seek to determine whether there were any conversations with that contact for a specified time period to return. Obtaining information on conversation context and location information where the user met the contact at the specified time period allows the user to recall pertinent issues to discuss with the contact or enhance and expand the topics of conversation with the contact when later engaged after a previous conversation.

In further embodiments, other searches than those described with respect to FIGS. 7 and 8 may be performed, such as searches just one location information or conversation context, and different combinations of the possible search terms for personal identifiers, conversation context, location information, and time periods.

The determination of whether information is related may use data mining algorithms known in the art to determine records having matching or related information that are related with a degree of certainty. The first and second threshold degrees of certainty used for different determinations may be the same or different degrees of certainty.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The letter designators, such as i and n, used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for providing contact information for contacts in a personal computing device in communication with a microphone, the computer program product comprising a computer readable storage medium having computer readable program code embodied therein that executes to perform operations, the operations comprising:

receiving an audio stream through the microphone;

performing context analysis of the audio stream to generate conversation context instances in the audio stream gathered at different times to store in a conversation context stream, wherein each conversation context instance includes a conversation context comprising information on content of conversation detected and a time of an audio segment from which the conversation context is detected;

generating location information instances each having information on a geographical location of the personal computing device and a time the geographical location was determined;

associating a contact record for a contact person with at least one conversation context instance of the detected conversation context instances and at least one location information instance having times within a period of time from a specified time; and storing the contact record in a contact database including a plurality of contact records for a plurality of contact persons, wherein the contact records include conversation context and location information associated with the contact persons for multiple time periods.

2. The computer program product of claim 1, wherein the conversation context comprises at least one of topics of conversation, names, locations, and emotions determined by performing context analysis of the audio stream.

3. The computer program product of claim 2, wherein the operations further comprise:

determining user content from multiple data sources related to the topics of conversation in the at least one conversation context instance and at least one location information instance associated with the contact record; and including in the contact record information on the user content.

4. The computer program product of claim 1, wherein a selected contact person comprises a new contact person to add to the contact database, wherein the operations further comprise:

determining whether a personal identifier of the new contact person is related to a personal identifier of an existing contact person having an existing contact record in the contact database with a threshold degree of certainty, wherein the contact record is created for the new contact person in response to determining that the personal identifier of the new contact person is not related to the personal identifier of an existing contact person in the contact database; and including in the existing contact record for the existing contact person the conversation context determined for the period of time.

5. The computer program product of claim 1, wherein the operations further comprise:

receiving a search request including at least one of a conversation context search term and location search term and a time period search term; and determining at least one contact record of the contact records in the contact database including conversation context and location information related to the at least one of the conversation context search term and the location search term and associated with a time period matching the time period search term; and returning information on each contact person associated with the determined at least one contact record including the at least one of the conversation context search term and the location search term.

6. The computer program product of claim 1, wherein the operations further comprise:

receiving a search request including a personal identifier search term and a time period search term;

determining a contact record for a contact person having a personal identifier related to the personal identifier search term;

determining from the determined contact record at least one of the conversation context and the location information associated with a time period matching the time period search term; and returning information for the contact person having the personal identifier related to the personal identifier search term and the at least of the conversation context and the location information associated with the time period matching the time period search term.

7. The computer program product of claim 6, wherein the determining the location information further comprises:

searching a calendar of a user of the personal computing device for any scheduled events within the period of time of the specified time; and indicating the scheduled events in the contact record for a selected contact person.

8. A system for providing contact information for contacts of a personal computing device, comprising:

a processor;

a microphone;

a computer readable storage medium having computer readable program code that when executed by the processor perform operations, the operations comprising:

receiving an audio stream through the microphone;

performing context analysis of the audio stream to generate conversation context instances in the audio stream gathered at different times to store in a conversation context stream, wherein each conversation context instance includes a conversation context comprising information on content of conversation detected and a time of an audio segment from which the conversation context is detected;

generating location information instances each having information on a geographical location of the personal computing device and a time the geographical location was determined;

associating a contact record for a contact person with at least one conversaation context instance of the detected conversation context instances and at least one location information instance having times within a period of time from a specified time; and storing the contact record in a contact database including a plurality of contact records for a plurality of contact persons, wherein the contact records include conversation context and location information associated with the contact persons for multiple time periods.

9. The system of claim 8, wherein the conversation context comprises at least one of topics of conversation, names, locations, and emotions determined by performing context analysis of the audio stream.

10. The system of claim 9, wherein the operations further comprise:

determining user content from multiple data sources related to the topics of conversation in the at least one conversation context instance and at least one location information instance associated with the contact record; and including in the contact record information on the user content.

11. The system of claim 8, wherein a selected contact person comprises a new contact person to add to the contact database, wherein the operations further comprise:

determining whether a personal identifier of the new contact person is related to a personal identifier of an existing contact person having an existing contact record in the contact database with a threshold degree of certainty, wherein the contact record is created for the new contact person in response to determining that the personal identifier of the new contact person is not related to the personal identifier of an existing contact person in the contact database; and including in the existing contact record for the existing contact person the conversation context determined for the period of time.

12. The system of claim 8, wherein the operations further comprise:

receiving a search request including at least one of a conversation context search term and location search term and a time period search term; and determining at least one contact record of the contact records in the contact database including conversation context and location information related to the at least one of the conversation context search term and the location search term and associated with a time period matching the time period search term; and returning information on each contact person associated with the determined at least one contact record including the at least one of the conversation context search term and the location search term.

13. The system of claim 8, wherein the operations further comprise:

receiving a search request including a personal identifier search term and a time period search term;

determining a contact record for a contact person having a personal identifier related to the personal identifier search term;

determining from the determined contact record at least one of the conversation context and the location information associated with a time period matching the time period search term; and returning information for the contact person having the personal identifier related to the personal identifier search term and the at least of the conversation context and the location information associated with the time period matching the time period search term.

14. The system of claim 13, wherein the determining the location information further comprises:

searching a calendar of a user of the personal computing device for any scheduled events within the period of time of the specified time; and indicating the scheduled events in the contact record for a selected contact person.

15. A method implemented in a personal computing device by a processor executing computer program code for providing contact information for contacts, comprising:

receiving an audio stream through a microphone;

performing context analysis of the audio stream to generate conversation context instances in the audio stream gathered at different times to store in a conversation context stream, wherein each conversation context instance includes a conversation context comprising information on content of conversation detected and a time of an audio segment from which the conversation context is detected;

generating location information instances each having information on a geographical location of the personal computing device and a time the geographical location was determined;

associating a contact record for a contact person with at least one conversation context instance of the detected conversation context instances and at least one location information instance having times within a period of time from a specified time; and storing the contact record in a contact database including a plurality of contact records for a plurality of contact persons, wherein the contact records include conversation context and location information associated with the contact persons for multiple time periods.

16. The method of claim 15, wherein the conversation context comprises at least one of topics of conversation, names, locations, and emotions determined by performing context analysis of the audio stream.

17. The method of claim 16, further comprising:

determining user content from multiple data sources related to the topics of conversation in the at least one conversation context instance and at least one location information instance associated with the contact record; and including in the contact record information on the user content.

18. The method of claim 15, wherein a selected contact person comprises a new contact person to add to the contact database, further comprising:

determining whether a personal identifier of the new contact person is related to a personal identifier of an existing contact person having an existing contact record in the contact database with a threshold degree of certainty, wherein the contact record is created for the new contact person in response to determining that the personal identifier of the new contact person is not related to the personal identifier of an existing contact person in the contact database; and including in the existing contact record for the existing contact person the conversation context determined for the period of time.

19. The method of claim 15, further comprising:

receiving a search request including at least one of a conversation context search term and location search term and a time period search term; and determining at least one contact record of the contact records in the contact database including conversation context and location information related to the at least one of the conversation context search term and the location search term and associated with a time period matching the time period search term; and returning information on each contact person associated with the determined at least one contact record including the at least one of the conversation context search term and the location search term.

20. The method of claim 15, further comprising:

receiving a search request including a personal identifier search term and a time period search term;

determining a contact record for a contact person having a personal identifier related to the personal identifier search term;

determining from the determined contact record at least one of the conversation context and the location information associated with a time period matching the time period search term; and returning information for the contact person having the personal identifier related to the personal identifier search term and the at least of the conversation context and the location information associated with the time period matching the time period search term.

* * * * *